(12) United States Patent
Fujii et al.

(10) Patent No.: US 6,208,050 B1
(45) Date of Patent: Mar. 27, 2001

(54) MOTOR AND BEARING STRUCTURE FOR MOTOR

(75) Inventors: Yoshio Fujii; Yosuke Yamada, both of Shiga (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 09/376,207

(22) Filed: Aug. 18, 1999

(30) Foreign Application Priority Data

Aug. 19, 1998 (JP) .................................................. 10-249162
Sep. 3, 1998 (JP) .................................................. 10-265697

(51) Int. Cl.[7] .............................. H02K 5/16; H02K 7/00; H02K 5/24; G11B 5/016
(52) U.S. Cl. ........................... 310/90; 310/67 R; 310/51; 360/99.04
(58) Field of Search .................................. 310/90, 67 R, 310/51; 360/99.04, 99.05, 99.07, 99.08, 99.12; 384/226, 227, 228, 238

(56) References Cited

U.S. PATENT DOCUMENTS

| | | | |
|---|---|---|---|
| 5,252,871 | * 10/1993 | Inoue ....................................... | 310/90 |
| 5,394,283 | * 2/1995 | Hans et al. ......................... | 360/98.07 |
| 5,446,325 | * 8/1995 | Iwabuchi ............................ | 310/67 R |
| 5,574,322 | * 11/1996 | Nii et al. ............................... | 310/90.5 |
| 5,783,884 | * 7/1998 | Fujishima et al. ...................... | 310/90 |

FOREIGN PATENT DOCUMENTS

| | | |
|---|---|---|
| 5-168212 | 7/1993 | (JP) . |
| 5-219708 | 8/1993 | (JP) . |
| 8-063872 | 3/1996 | (JP) . |
| 9-065633 | 3/1997 | (JP) . |

* cited by examiner

Primary Examiner—Nestor Ramirez
Assistant Examiner—Dang Dinh Le
(74) Attorney, Agent, or Firm—Cummings & Lockwood (57) ABSTRACT

In a motor and bearing structure for a motor, a shaft is rotatably mounted on a fixed support, and a radially-extending rotor is connected to the shaft and rotatable therewith. A ball bearing assembly having an inner race, an outer race, and at least one ball bearing seated between the inner and outer races, is mounted between the shaft and the support for rotating the shaft and rotor relative to the support. A stator is radially spaced relative to the rotor, and fixedly mounted relative to the rotatable shaft and rotor. An approximately arc-shaped preload magnet is fixedly mounted on the support, and is axially spaced adjacent to the rotor to magnetically attract the rotor in the axial direction of the shaft and, in turn, apply a preload to the ball bearing assembly to prevent vibrations, wobbling or other rotational instability of the rotor. A ring-like, oil-impregnated bearing also rotatably supports the rotor and the shaft to further enhance the rotational stability of the rotor. The oil-impregnated bearing slidably contacts either (i) the outer race of the ball bearing assembly for rotating with the shaft and rotor relative to the outer race, or (ii) the inner race of the ball bearing assembly for rotating with the shaft and rotor relative to the inner race.

31 Claims, 4 Drawing Sheets

MOTOR AND BEARING STRUCTURE FOR MOTOR

FIELD OF THE INVENTION

The present invention relates to thin motors, and more particularly, to thin type motors for driving data storage media, such as floppy disks.

BACKGROUND OF THE INVENTION

There is a current demand to manufacture as compact as possible disk drives and other devices for driving data storage media, and accordingly, there is a corresponding demand to manufacture as compact as possible the motors used to drive the media in such devices. In some applications, it is also desirable that such motors be as thin as possible.

Conventional motors used for driving storage media, such as floppy disks, typically employ a pair of ball bearing assemblies aligned with each other in the direction of the rotational axis of the motor to ensure stable operation of the motor. In order to reduce the height or thickness of a motor, i.e., the dimension of the motor in its axial direction, certain prior art motors have employed only a single ball bearing assembly. However, in these types of motors, additional measures have been required to ensure stable operation. Otherwise, because only a single ball bearing is employed, the motor would vibrate, wobble and/or wave the media during rotation, and in turn cause errors in recording and reproducing data on the media.

Figure 1:
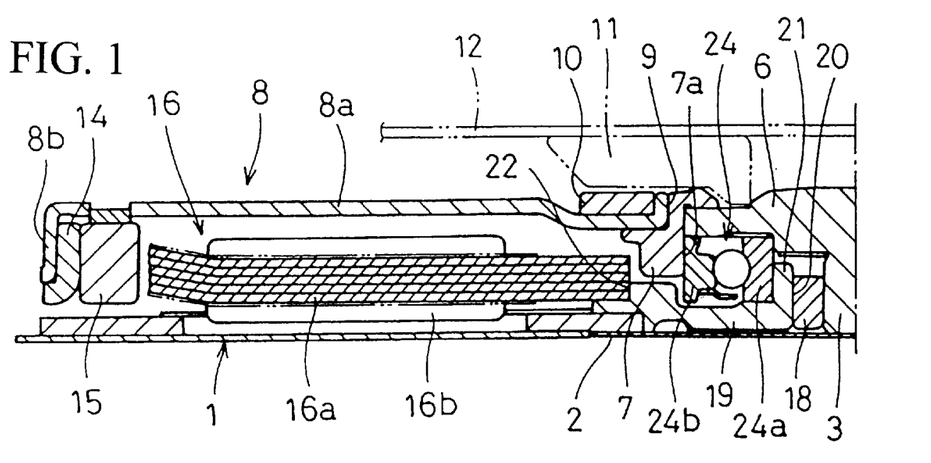
FIG. 1 is a partial, cross-sectional view of a thin type motor disclosed in a commonly assigned, co-pending patent application, and which employs a single ball bearing assembly and an oil-impregnated bearing for rotating the shaft and rotor.

Japanese laid-open patent application number Hei6-202186 (Publication No. Hei 8-63872) shows a prior art approach for stabilizing the rotation of a motor, wherein the magnetic centers of the stator and driving magnet of the motor are offset relative to each other in the axial direction of the motor. This offset applies a magnetic bias to the ball bearing which is intended to eliminate or reduce any looseness in the bearing and, in turn, stabilize rotation of the motor. One problem associated with this approach in relatively thin motors is that the axial thicknesses of the stator and driving magnet are relatively small, and therefore the magnetic bias applied to the ball bearing is insufficient to stabilize rotation of the motor. The motor of this Japanese laid-open patent application employs an oil-impregnated bearing in addition to the single ball bearing. The oil-impregnated bearing is formed of a ring-like metal member which is impregnated with oil and seated between the rotatable shaft and a stationary member of the motor Another thin type motor having a thickness of several millimeters and employing an oil-impregnated bearing is illustrated in FIG. 1. The motor of FIG. 1 is essentially the same as that illustrated in FIG. 6 of co-pending U.S. patent application Ser. No. 09/114,007, which is assigned to the Assignee of the present invention, and is hereby expressly incorporated by reference as part of the present disclosure. The motor of FIG. 1 includes a cover plate 2 extending over an opening formed in a stationary member 1, such as a chassis of a device for driving a floppy disk. A rotor hub 6 is formed integral with an upper end portion of a rotatably-mounted shaft 3. A rotor yoke 8 is formed of a magnetic material, such as a ferrous material, and is fixedly fitted by means of coupling member 7 around a peripheral portion of the rotor hub 6.

The rotor yoke 8 is composed of a substantially plate-like base 8a and a depending or bent-down section 8b. The base 8a defines an opening 9, and the bent-down section 8b is formed integral with the base and projects downwardly from a peripheral end portion of the base. The coupling member 7 is fitted within the opening 9 of the base 8a. A chucking magnet 10 is attached to an upper face of the base 8a around the periphery of the opening 9. The chucking magnet 10 serves to attract a metal portion 11 on the backside of a floppy disk, as shown in broken lines in FIG. 1, to secure the floppy disk on the rotor.

As also shown in FIG. 1, a primary drive magnet 15 is fitted within the bent-down section 8b of the rotor yoke 8 via an insertion member 14. A stator 16 is arranged under the rotor yoke 8 so as to oppose the main magnet 15 with a predetermined space or gap therebetween. The -stator 16 is formed with a plurality of teeth 16a of a core (only one tooth is shown in the Figure), and an electromagnetic coil 16b is wound around each of the teeth.

A ring-like, oil-impregnated bearing 18 is fitted around a lower peripheral portion of the shaft 3, and a ring-shaped bearing holder 19 is fixedly coupled or connected with the stationary member 1 and arranged outside of the oil-impregnated bearing. Also, an opening 20 is formed through the center of the bearing holder 19, and a circular projection or upright section 21 extends around the periphery of the opening. The oil-impregnated bearing 18 is fixedly fitted within the opening 20 of the circular projection 21 so that an outer peripheral face of the oil-impregnated bearing 18 slides around an inner peripheral face of the circular projection 21.

As further shown in FIG. 1, an elevated section 22 is formed on a radially outward upper peripheral surface of the bearing holder 19. The stator 16 is supported in such a manner that an inner peripheral portion of the core of the stator is fitted to the elevated section 22. An inner race 24a of a ball bearing 24 is fixedly fitted to the outside of the circular projection 21 of the bearing holder 19 to thereby support the ball bearing on the bearing holder. An outer race 24b of the ball bearing 24, on the other hand, is fixedly fitted onto an inner peripheral wall 7a of the coupling member 7.

In this type of construction, the shaft 3 rotates with the rotor hub 6, the coupling member 7, the rotor yoke 8, the oil-impregnated bearing 18, and the outer race 24b. The inner race 24a of the ball bearing 24, on the other hand, is not rotated, but rather is fixedly secured to the bearing holder 19. Thus, the outer peripheral surface of the oil-impregnated bearing 18 slides around the inner peripheral surface of the circular projection 21 of the bearing holder 19.

The relatively thin motor shown in FIG. 1 is an outer rotor type motor wherein the rotor extends radially outward beyond the stator 16, and the primary drive magnet 15 is located outside of the stator. The rotor has a radius, i.e. the distance from the center of rotation to the outer periphery of the rotor, which is more than twice as large as the thickness of the motor in the axial direction. As described above, the thickness of the motor is reduced by the use of a single ball bearing 24. In addition to the single ball bearing 24, the oil-impregnated bearing 18 is provided to reduce vibration of the rotor, which is composed of the rotor hub 6 and the rotor yoke 8, during its rotation.

One drawback associated with this type of bearing structure arises from the bearing holder 19 being mounted between the oil-impregnated bearing 18 and the ball bearing 24. When the finishing accuracy on the inner and/or outer peripheral surfaces of the circular projection 21 is inadequate, and particularly when the finishing accuracy of the portions of these surfaces which contact the oil-impregnated bearing 18 and/or the ball bearing 24 is inadequate, rotational irregularity may be caused in the motor which can, in turn, significantly affect or reduce the rotational characteristics of the motor.

In addition, relatively complicated processing must be applied to the bearing holder 19 in order to manufacture the bearing holder as shown. As a result, a relatively hard material cannot be used to form the bearing holder. These factors further enhance the difficulties associated with increasing the life of the oil-impregnated bearing 18.

Another drawback associated with bearing structures of this type, is that the bearing holder 19 mounted between the oil-impregnated bearing 18 and the bearing 24 makes it difficult to reduce the dimension of the motor in its radial direction.

Accordingly, a primary object of the present invention is to provide a bearing structure which allows the motor to be both relatively thin in its axial direction and to achieve stable operation.

It is another object of the present invention to provide a thin type motor which is substantially free from irregular rotation.

It is still another object of the present invention to provide a motor for driving data storage media which allows data to be accurately written onto or read from the media. It is a further object of the present invention to provide a motor for driving data storage media, such as a thin motor of the type described, wherein the preload or magnetic bias applied to the ball bearing is sufficient to achieve stable rotation of the motor, and thereby avoid errors in writing data to or reading data from a floppy disk or like storage medium that otherwise might be caused from rotational instability.

A still further object of the present invention is to improve the rotational characteristics of thin type motors, and if oil-impregnated bearings are used in cooperation with single ball bearings to improve the rotational stability of such motors, to increase the useful lives of such oil-impregnated bearings.

SUMMARY OF THE INVENTION

The present invention is directed to an electric motor comprising a support, a motor shaft defining an axis and rotatably mounted on the support, and a radially-extending rotor coupled to the shaft and rotatable therewith. A ball bearing assembly of the motor includes an inner race, an outer race, and a plurality of balls located between the inner race and the outer race, and coupled between the shaft and support for rotating the shaft and rotor relative to the support. A stator is spaced adjacent to the rotor and fixed relative to the rotatable shaft and rotor. The motor of the invention further includes at least one of the following features for facilitating rotational stability of the rotor:

(a) at least one preload magnet fixedly mounted on the support, axially spaced adjacent to the rotor, and extending along an approximate arc to thereby magnetically attract the rotor in the axial direction of the shaft and, in turn, apply a preload to the ball bearing assembly; and (b) an oil-impregnated bearing rotatably supporting the shaft and rotor on the support, and slidably contacting either (i) the outer race of the ball bearing assembly for rotating with the shaft and rotor relative to the outer race, or (ii) the inner race of the ball bearing assembly for rotating with the shaft and rotor relative to the inner race.

Preferably, the preload magnet is approximately arc shaped. In addition, the material and/or arcuate length of the preload magnet preferably are selected to further minimize any vibrations, wobbling or other rotational instability of the rotor. Accordingly, in one preferred embodiment of the invention, the preload magnet is formed of a magnetic material including a component of rare earth metal selected from the neodymium group, and is bonded by a resin material. The arcuate length of the magnet is within the range of approximately one sixth to approximately one eighth of a circumference defined by a radius of the magnet. In another preferred embodiment of the invention, the preload magnet is formed of a ferritic rubber material, and the arcuate length of the magnet is equal to approximately one fourth of a circumference defined by a radius of the magnet.

In another preferred embodiment of the invention, a ring-like oil-impregnated bearing is mounted between the rotor and the outer race of the ball bearing assembly, to slidably contact an outer peripheral surface of the outer race and rotates with the rotor and shaft relative to the outer race. In another preferred embodiment of the invention, a ring-like oil-impregnated bearing is mounted between the shaft and the inner race of the ball bearing assembly, to slidably contact an inner peripheral surface of the inner race and rotate with the rotor and shaft relative to the inner race.

One advantage of the present invention is that the preload magnet may apply a sufficient preload to the ball bearing assembly to substantially avoid the vibration, wobbling or rotational instability associated with prior art motors having insufficient preloads, as described above. The present invention, therefore, is particularly advantageous for use in constructing relatively thin motors, such as a motor having a rotor defining a radius which is at least twice as large as the thickness of the motor in the axial direction of the shaft. Thus, these types of relatively thin motors can be constructed with only a single ball bearing and achieve stable rotation. Another advantage of the present invention is that the oil-impregnated bearing may be employed to slidably contact either the outer race or the inner race of the ball bearing to further enhance the rotational stability of the motor and increase the useful life of the oil-impregnated bearing. As a result, a relatively thin motor of the type described can be produced with significantly improved rotational characteristics in comparison to comparably-thin conventional motors.

These and other objects and advantages of the present invention will become more apparent in view of the following detailed description of preferred embodiments and accompanying drawings.

DETAILED DESCRIPTION OF THE PREFERRED EMBODIMENTS

Figure 2:
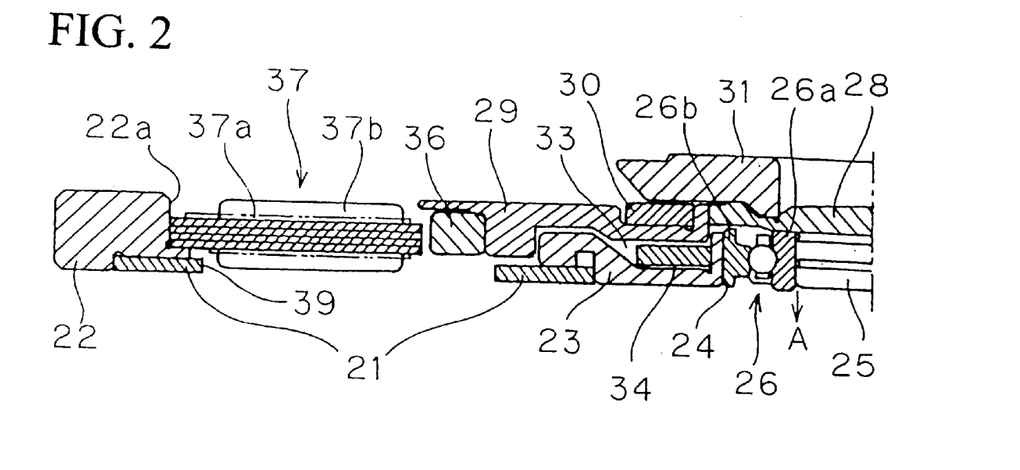
FIG. 2 is a partial, cross-sectional view of a first embodiment of the present invention.
Figure 3:
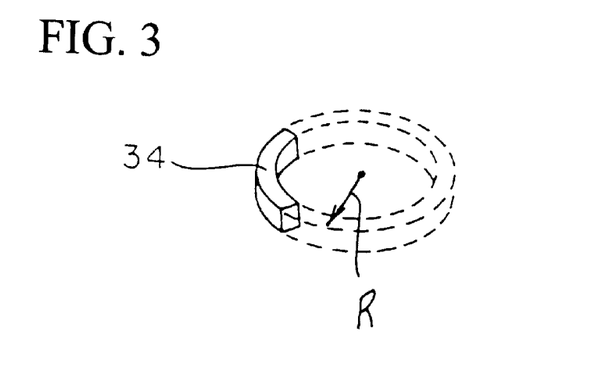
FIG. 3 is a perspective view of the preload magnet of the motor of FIG. 2.

With reference to FIGS. 2 and 3, the illustrated embodiment is an exemplary application of the invention to a thin motor having a thickness of several millimeters and used for driving a storage disk, such as a floppy disk. As may be recognized by those skilled in the pertinent art based on the teachings herein, however, the present invention is equally applicable to any of numerous other types of motors.

Referring to FIG. 2, the reference numeral 21 denotes a stationary member, such as a chassis or frame of a floppy disk driving device. The reference numerals 22 and 23 denote supporting members mounted on the stationary member 21. As shown in FIG. 2, the supporting member 23 radially opposes an inner peripheral wall 22a of the supporting member 22. As can be seen, the supporting member 23 is concave disk shaped, and defines an opening 24 in a central portion thereof. The reference numeral 25 denotes a shaft arranged at the central portion in the opening 24. The reference numeral 26 denotes a ball bearing assembly interposed between the shaft 25 and a peripheral surface of the opening 24. The ball bearing 26 comprises an inner race 26a fixedly fitted on the shaft 25, and an outer race 26b inserted in the opening 24 and fixedly supported by the supporting member 23.

Reference numeral 28 denotes a rotor hub integrally formed with the shaft 25 and extending over an upper end portion of the shaft. The reference numeral 29 denotes a rotor yoke made of a magnetic material, such as a ferrous material, and composing the rotor in combination with the rotor hub 28. The reference numeral 30 denotes a chucking magnet mounted in a circular recess formed on an upper surface of the rotor yoke 29. The chucking magnet 30 serves to magnetically attract a metal portion 31 on the backside of a floppy disk, or other storage medium, to thereby immobilize or fix the disk relative to the rotor.

Reference numeral 33 denotes a concave section formed on an upper surface of the supporting member 23. The reference numeral 34 denotes an approximately arc-shaped preload magnet comprised of, for example, a ferritic rubber magnet. The preload magnet 34 is fixedly secured within the concave section 33 of the supporting member 23 to define a gap of predetermined width between an upper surface of the preload magnet and a lower surface of the rotor yoke 29. The preload magnet 34 is preferably fixedly secured by an adhesive to the bottom and side walls of the recess of the supporting member 23. However, as may be recognized by those skilled in the pertinent art based on the teachings herein, the preload magnet 34 may be mounted to the supporting member 23, or may be mounted or otherwise secured to any of several other suitable surfaces or components of the motor, in any of numerous different ways, which now or later become known for performing the functions of the preload magnet described herein. The preload magnet 34 is positioned immediately adjacent to the outer race 26b of the ball bearing 26. The magnetic force of the preload magnet 34 serves to magnetically attract or bias the rotor yoke 29, which is made of magnetic material, so that a preload is exerted via the rotor hub 28 and shaft 25 downwardly onto the ball bearing 26 in approximately the axial direction of the motor or shaft, as indicated by the arrow "A" in FIG. 2.

The present inventors have learned that if the preload magnet were shaped as a complete ring, as shown, for example, by broken lines in FIG. 3, minute undulations on individual surfaces of the preload magnet and rotor yoke 29 would cause the gap between the preload magnet and rotor yoke to change frequently during rotation of the motor, and thereby result in the occurrence of rotational irregularity of the motor as a whole.

With the preload magnet 34 shaped in the approximate form of an arc, as shown in solid lines in FIG. 3, however, only a specific portion of the rotor yoke 29 is magnetically attracted. This, in turn, minimizes any variation in the gap between the preload magnet 34 and rotor yoke 29 that otherwise would be caused by any minute undulations on the individual surfaces of the preload magnet and rotor yoke during rotation. As a result, any rotational irregularity is significantly reduced during rotation of the motor, thereby causing the motor to achieve stable rotation. The term "arc" is used herein to define a part of a circumference of a circle or other curved line. Accordingly, the approximately arc-shaped preload magnet extends along a part of a circumference of a circle or other curved line, as opposed to extending along the entire circumference or other closed loop or curved line.

In accordance with a preferred embodiment of the present invention, the material, magnetic force, and/or length of the arc-shaped preload magnet 34 are selectively determined in order to minimize any undulating, wave-like or swelling motion of the rotor or storage media during rotation of the motor. For example, when the preload magnet 34 is made of a ferritic rubber magnet as described above, the arcuate length thereof is preferably determined to be substantially equivalent to one fourth of the circumference defined by a radius "R" of the arc-shaped magnet, as shown typically in FIG. 3.

The preload magnet 34 may, of course, be formed of a resin bonded magnet comprising Nd-Fe-B group materials (also referred to as a "neodymium" group materials). In this case, the arcuate length of the preload magnet 34 is preferably determined to be within the range of approximately one sixth to approximately one eighth of the entire circumference defined by the radius "R" of the preload magnet, as shown typically in FIG. 3.

With reference to FIG. 2, the reference numeral 36 denotes a primary drive magnet fitted around a peripheral portion of the rotor yoke 29. The reference numeral 37 denotes a stator. The stator 37 is formed with a core 37a, and an electromagnetic coil 37b is wound around the core 37a. Note that the core 37a is provided with a plurality of teeth, the number of which correspond to the number of poles of the motor, and the electromagnetic coil 37b is wound around each of the teeth. The stator 37 is fixedly supported by the supporting member 22 so as to oppose the primary drive magnet 36 and define a predetermined space therebetween. As can be seen, the rotor assembly including the rotor hub 28, the rotor yoke 29 and the primary drive magnet 36, is located radially within the stator 37 to form an inner rotor type motor.

The core 37a is inserted in and fixed around an inner peripheral portion of the inner peripheral wall 22a of the supporting member 22. As also shown, a lower portion of each tooth and coil of the stator extend into, or are received within a sector-shaped opening or aperture 39 formed in the stationary member 21. The sector-shaped openings 39 receiving the stator 37 are arranged in a circular pattern, corresponding to the arrangement of the teeth of the stator.

As may be recognized by those of ordinary skill in the pertinent art based on the teachings herein, the openings 39 may take any of numerous other suitable shapes, such as rectangles or circles, in order to receive the downwardly-extending teeth and coils of the stator.

As also shown in FIG. 2, the rotor assembly defines a radius which is more than twice as large as the thickness of the motor in the axial direction of the shaft 25, thereby providing the motor with a thin configuration. To reduce the thickness of the motor to within several millimeters, technical improvements are implemented. For example, only a single ball bearing assembly 26 is mounted between the shaft 25 and the supporting member 23, and the lower portion of each tooth of the stator 37 is received within the respective opening 39.

As described above, according to this preferred embodiment of the invention, the preload magnet 34 attracts the rotor yoke 29 in approximately the axial direction A thereof. This allows application of a downwardly directed preload via the rotor hub 28 and shaft 25 onto the ball bearing 26 in the axial direction A. Therefore, the magnetic force of the preload magnet 34 compensates for any insufficiency in the preload that is otherwise applied to the ball bearing 26 in the conventional manner of axially offsetting the magnetic centers of the stator and primary drive magnet relative to each other, as also shown in FIG. 2.

As a result, even with a thin motor having a thickness of several millimeters, a sufficient preload can be applied onto the ball bearing 26 to thereby avoid vibration, unsmooth operation, and the like. This allows stable rotation of the motor to be obtained, and in turn avoids possible errors that otherwise would occur in writing data to and reading data from a floppy disk or like storage medium.

Also, since the preload magnet 34 is preferably shaped as an arc, or otherwise extends through only a discrete portion of a ring extending around the shaft, only a specific portion of the rotor yoke 29 can thereby be magnetically attracted by the preload magnet. This allows any variation of the gap between the preload magnet 34 and the rotor yoke 29, which may be caused by any minute undulations on the individual surfaces of the preload magnet 34 and rotor yoke 29 during rotation of the motor, to be smaller. As a result, any rotational irregularity is reduced during operation of the motor, thereby allowing stable rotation to be implemented.

In this preferred embodiment of the present invention, the preload magnet 34 is positioned immediately at the outside of the outer race 26b of the ball bearing 26. However, as indicated above and may be recognized by those skilled in the pertinent art based on the teachings herein, the position in which the preload magnet 34 is arranged is not restricted to the above-mentioned position.

For example, the preload magnet 34 may be arranged at a position apart from the outer race 26b of the ball bearing 26, or may be mounted on the side of the rotor yoke 29. That is, the preload magnet may be arranged at any of numerous different positions selected to reduce any effect of minute undulations, or otherwise to reduce any vibration, wobbling or other instability during rotation of the motor. As described above, the material, magnetic force, and/or arcuate length of the approximately arc-shaped preload magnet may be selectively determined to further reduce any rotational instability and to otherwise optimize the rotational characteristics of the motor.

In addition, although the illustrated embodiments of the invention employ only a single arc-shaped preload magnet, as may be recognized by those skilled in the pertinent art based on the teachings herein, a plurality of arc-shaped or like preload magnets may be employed and discretely arranged to reduce any rotational irregularity and/or otherwise optimize the rotational characteristics of the motor.

Also, the illustrated embodiment is described in connection with an exemplary case wherein a floppy disk is used as a storage disk. However, as will be recognized by those skilled in the pertinent art based on the teachings herein, the present invention may be applied to any of numerous other types of motors for driving other types of storage disks or mediums other than floppy disks.

Accordingly, one advantage of the present invention is that the magnetic force of the preload magnet compensates for the insufficient preload applied to the ball bearing in conventional motors as described above, and therefore the associated vibration, unsmooth operation, and the like encountered in the prior art motors can be avoided. This, in turn, allows for stable rotation of the motor, thereby avoiding possible errors that otherwise might occur in writing data to and reading data from a storage disk, such as a floppy disk, so as to improve the reliability thereof Also, since the preload magnet 34 is preferably shaped as an arc, or otherwise extends adjacent to only a discrete portion of a circumference of the rotor, only a specific portion of the rotor thereby can be magnetically attracted by the preload magnet. This reduces any variation of the gap between the preload magnet and the rotor yoke, which otherwise might be caused by any minute undulations on the individual surfaces of the preload magnet and rotor yoke during rotation of the motor, and therefore allows for stable rotation to be implemented. Another advantage of the present invention is that an insufficient preload, such as that experienced in conventional thin-type motors as described above, can be avoided, and a sufficient preload can be applied to the ball bearing even in thin motors of the type having a rotor defining a radius at least twice as large as the thickness of the motor in the axial direction of the shaft. Thus, a significant advantage of the present invention is that a thin motor of this type may be provided with stable rotational characteristics.

Another advantage of the present invention is that the preload magnet can be miniaturized by the use of a resin bonded magnet comprising material in the neodymium group (or "Nd-Fe-B" group), which material has a relatively high magnetic flux density and a greater magnetic attraction force.

Yet another advantage of the present invention is that relatively inexpensive ferritic rubber material can be employed to form the preload magnet, and therefore significant cost reductions can be achieved.

Still another advantage of the present invention is that the rotor may be positioned radially inwardly relative to the stator, and therefore the overall diameter of the rotor can be reduced. This feature further enhances the rotational stability of the motor, and is particularly advantageous in relatively thin motors of the type described employing only a single ball bearing assembly to rotatably support the shaft and rotor.

As seen in FIG. 2, the supporting member 22, stator 37, supporting member 23, ball bearing 26 and shaft 25 extend horizontally, i.e. in a direction transverse to the axis of rotation, and extend along a common plane, or otherwise are arranged in a radially side-by-side manner, while the rotor yoke 29 and rotor hub 28 extend radially over the supporting structure 23, ball bearing 26 and shaft 25, to thereby attain a thin motor structure. Note that the stator 37 has a substantially flat shape. The preload magnet 34 is located on the stationary member 23 below the rotor hub 28 to thereby attract the rotor hub in the axial direction A.

Figure 4:
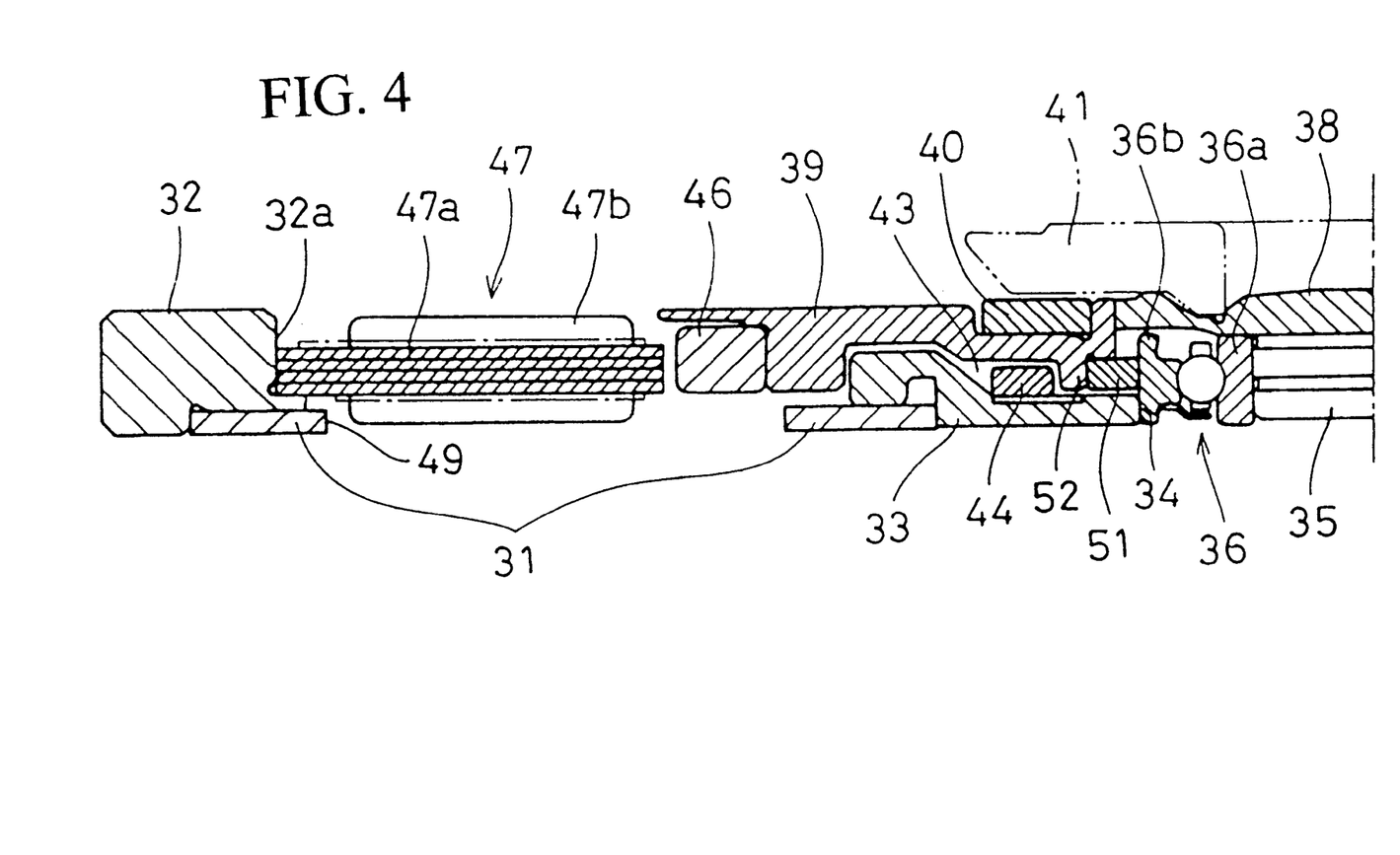
FIG. 4 is a partial, cross-sectional view of another embodiment of the present invention employing an oil-impregnated bearing which slidably contacts the outer race of the ball bearing assembly.

Turning to FIG. 4, another embodiment of the present invention is illustrated. The embodiment of FIG. 4 illustrates an exemplary application of the present invention to a thin motor having a thickness of several millimeters and which is used for driving a storage disk, such as a floppy disk. As may be recognized by those skilled in the pertinent art based on the teachings herein, however, the present invention is equally applicable to any of numerous other types of motors.

In FIG. 4, the reference numeral 31 denotes a stationary member, such as a chassis of a floppy disk drive device. The reference numerals 32 and 33 denote supporting members mounted on the stationary member 31. As shown, the supporting member 33 opposes in the radial direction of the motor an inner peripheral wall 32a of the supporting member 32. The supporting member 33 is approximately basin or concave shaped, and defines an opening 34 extending through a central portion thereof. The reference numeral 35 denotes a shaft arranged in the opening 34. The reference numeral 36 denotes a ball bearing interposed between the shaft 35 and a peripheral surface defining the opening 34. An inner race 36a of the ball bearing is fixedly fitted on the shaft 35, and an outer race 36b of the ball bearing is inserted through the opening 34 and fixedly supported by the supporting member 33.

As also shown in FIG. 4, reference numeral 38 denotes a rotor hub integrally formed with the shaft 35 and extending over an upper end portion of the shaft. The reference numeral 39 denotes a rotor yoke made of a magnetic material, such as a ferrous material, and composing a rotor in combination with the rotor hub 38. The reference numeral 40 denotes a chucking magnet fixedly mounted in, or otherwise fixedly secured in a circular recess formed on an upper surface of the rotor yoke 39. The chucking magnet 40 serves to magnetically attract a metal portion 41 located on the backside of a floppy disk or like storage medium to secure the disk relative to the rotor.

As also shown in FIG. 4, reference numeral 43 denotes an approximately concave-shaped recess or depression formed on a radially inner side of an upper surface in the drawing of the supporting member 33. The reference numeral 44 denotes an approximately arc-shaped preload magnet made, for example, of a ferritic rubber magnet, which is preferably fixed by an adhesive or the like to the concave section 43 of the supporting member 33 to define a gap of predetermined size between the preload magnet and a lower surface of the rotor yoke 39. In the same manner as described above in connection with the previous embodiment, the magnetic force of the preload magnet 44 serves to magnetically attract the rotor yoke 39 made of a magnetic material, and thereby exert via the rotor hub 38 and the shaft 35 a downwardly-directed preload on the ball bearing 36 in approximately the axial direction of the motor.

Since the preload magnet 44 is approximately arc shaped, only a specific portion of the rotor yoke 39 is thereby attracted. In the same manner as described above, this reduces any variation of the gap between the preload magnet 34 and the rotor yoke 39 that otherwise might be caused by any minute undulations on the individual surfaces of the preload magnet and rotor yoke. As a result, any vibration, wave-like motion or other instability during rotation of the motor is reduced, thereby allowing stable rotation to be implemented.

Also in the same manner as described above in connection with the previous embodiments, the material, magnetic force, and/or length of the arc-shaped preload magnet are preferably selectively determined in order to minimize any vibrations and/or rotational instability during rotation of the motor. Also as described above, when the preload magnet 44 is made of a ferritic rubber magnet, the arcuate length thereof is preferably determined to be substantially equivalent to one fourth of the circumference defined by a radius of the arc-shaped magnet.

The preload magnet 44 may, of course, be formed of a plastic or resin bonded magnet comprising material in a Nd-Fe-B group (or "neodymium" group). In this case, the arcuate length of the preload magnet 44 is preferably determined to be substantially equivalent to one eighth or one sixth of the entire circumference defined by the radius of the arc-shaped magnet.

As also shown in FIG. 4, reference numeral 46 denotes a ring-shaped primary drive magnet fixedly fitted on a peripheral portion of the rotor yoke 39. The reference numeral 47 denotes a stator formed with a core 47a on which a coil 47b is wound around. As shown, the stator 47 is supported by the supporting member 32 and radially opposes the primary drive magnet 46 to define a predetermined space therebetween. As also shown, the core 47a is inserted in and fixed on an inner peripheral portion of the inner peripheral wall 32a of the supporting member 32. A lower portion of the stator 47 extends into or is received within a sector-shaped opening or aperture 49 formed on the stationary member 31.

As also shown in FIG. 4, reference numeral 51 denotes an oil-impregnated bearing, and reference numeral 52 denotes an insertion member for receiving the oil-impregnated bearing and formed as a downwardly-extending boss integral with, and on an inner periphery of a lower surface of the rotor yoke 39. The oil-impregnated bearing 51 is formed of a ring-shaped metal member made of a porous material that absorbs and retains an oil or other lubricant for lubricating the interface between the bearing and any member(s) slidably contacting the bearing. For instance, the oil-impregnated bearing 51 may be made of a sintered metal typically formed with pores and/or voids which can receive and retain a liquid lubricant. The sintered metal member may be formed in accordance with any of a variety of procedures, and may employ any of a variety of appropriate materials by, for instance, compression-molding graphite and/or ferrous powders and/or flakes, sintering the molded material, and thereafter impregnating the sintered material with oil or other lubricant.

As may be recognized by those of ordinary skill in the pertinent art based on the teachings herein, the oil-impregnated bearing may take the form of any of numerous lubricant-impregnated bearings that are currently known, or which later become known for performing the functions described herein. As shown in FIG. 4, the oil-impregnated bearing 51 is fixedly fitted in the insertion member 52 and thereby secured to the rotor yoke 39. Upon rotation of the shaft 35, the oil-impregnated bearing 51 rotates jointly with the inner race 36a of the ball bearing 36 and the rotor hub 38. In this rotation, the oil-impregnated bearing 51 slides around the outer peripheral surface of the outer race 36b of the ball bearing 36.

As described above, a single ball bearing 36 is used for reducing the thickness in the axial direction of the motor. In addition, the oil-impregnated bearing 51 is provided in combination with the single ball bearing 36 in order to further enhance the rotational stability of the rotor. In accordance with this preferred embodiment of the present invention, no component members, such as the bearing holders described above in connection with conventional motors, are included between the ball bearing and the oil-impregnated bearing, and therefore the oil-impregnated bearing 51 slides around the outer peripheral surface of the outer race 36b of the ball bearing 36. Accordingly, one advantage of this preferred embodiment of the present invention, is that any rotational instability caused by bearing holders and the like associated with the above-described motors can be avoided.

In accordance with this preferred embodiment of the present invention, the oil-impregnated bearing slides around the outer peripheral surface of the outer race of the ball bearing to thereby improve the rotational characteristics of the motor. As a result, stable rotation of the motor is achieved, and thus any errors in writing data to or in reading data from a floppy disk or the like that otherwise might be associated with rotational instability can be avoided. It is noted that the radial internal clearance of ball bearings is typically within the range of about 5 to 10 µm in C3, and in the case of ball bearings having potentially high accuracy, the rotational deviation of the outer race may be at most approximately 1 µm. Accordingly, in the preferred configuration of FIG. 4, the radial deviation of the rotor assembly during the rotation can be maintained within a range of approximately 1 to 2 µm.

In addition, since no component members are included between the ball bearing and the oil-impregnated bearing, the overall dimension of the motor in its radial direction can be reduced. In addition, the additional processing associated with such component members, such as with conventionally-required bearing holders, is avoided. This allows the processing time, and therefore the associated costs of the motor and bearing structure of the invention to be reduced.

Another advantage of this preferred embodiment of the present invention is that the oil-impregnated bearing 51 slidably contacts the outer peripheral surface of the outer race 36b of the ball bearing 36, and this surface of the ball bearing is formed of material having a high finishing accuracy and a high hardness. This, in turn, allows the service life of the oil-impregnated bearing 51 to be increased over comparable bearings employed in conventional motors or bearing structures.

Another advantage of this preferred embodiment of the present invention is that the oil-impregnated bearing 51 can be supported without component members installed or otherwise included between the rotor yoke 39 and the oil-impregnated bearing. Accordingly, not only can the rotation of the motor be stabilized, but the overall dimension of the motor in its radial direction can be further reduced in comparison to conventional motors as described above.

Another advantage of this preferred embodiment of the present invention is that the preload magnet 44 is located adjacent to the rotor yoke 39, and the rotor yoke is in turn attracted by the magnetic force of the preload magnet. Accordingly, a preload can be applied onto the ball bearing 36 downwardly via the rotor hub 38 and the shaft 35 in the axial direction of the motor. This allows for the application of a sufficient preload to the ball bearing 36, even in thin-type motors having thicknesses of several millimeters, thereby further stabilizing the rotation of such motors.

Figure 5:
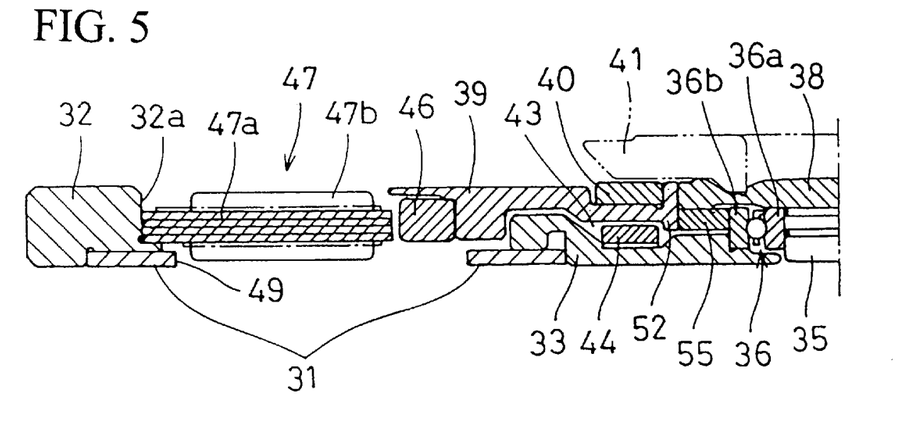
FIG. 5 is a partial, cross-sectional view of still another embodiment of the present invention employing a different-shaped oil-impregnated bearing in a manner similar to that of FIG. 4.

In FIG. 5, another motor and bearing structure embodying the present invention is illustrated. The motor and bearing structure of FIG. 5 is essentially the same as that described above with reference to FIG. 4, and therefore the same reference numerals are used to indicate the same elements. The primary difference between the embodiment of FIG. 5 in comparison to the embodiment of FIG. 4 is the width in the radial direction of the oil-impregnated bearing 55 relative to its thickness in the axial direction thereof. As can be seen, the width of the oil-impregnated bearing 55 of FIG. 5 is larger than that of the oil-impregnated bearing 51 of FIG. 4. The basic configuration of the motor and bearing structure of FIG. 5 is the same as that of FIG. 4 in other aspects. The different configuration of the oil-impregnated bearing of FIG. 5 provides the same or equivalent effects to those of the construction illustrated in FIG. 4.

The embodiments of FIGS. 4 and 5 are described in the case in which the oil-impregnated bearing 51 or 55 is fitted within the insertion member 52 formed in the rotor yoke 39. Such an insertion member, however, may be formed instead in the rotor hub 38. Accordingly, as may be recognized by those skilled in the pertinent art based on the teachings herein, the insertion member may define any of numerous different configurations in order to perform the function of supporting the oil-impregnated bearing 51 or 55 to slide around the outer peripheral surface of the outer race 36b, or to slide around the inner peripheral surface of the inner race 36a of the ball bearing 36.

As also may be recognized by those of ordinary skill in the pertinent art based on the teachings herein, although in the illustrated embodiments of FIGS. 4 and 5 the preload magnet 44 is arranged immediately to the outside of, or adjacent to the outer race 36b of the ball bearing 36, the preload magnet may be located in any of numerous other suitable or desired positions for performing the functions described herein. For example, the preload magnet 44 may be arranged apart from the outer race 36b.

Similarly, although the illustrated embodiments are described in connection with an exemplary case in which a floppy disk is used as a storage disk, the present invention may, of course, be applied to motors for driving any of numerous other types of storage disks or media.

Figure 6:
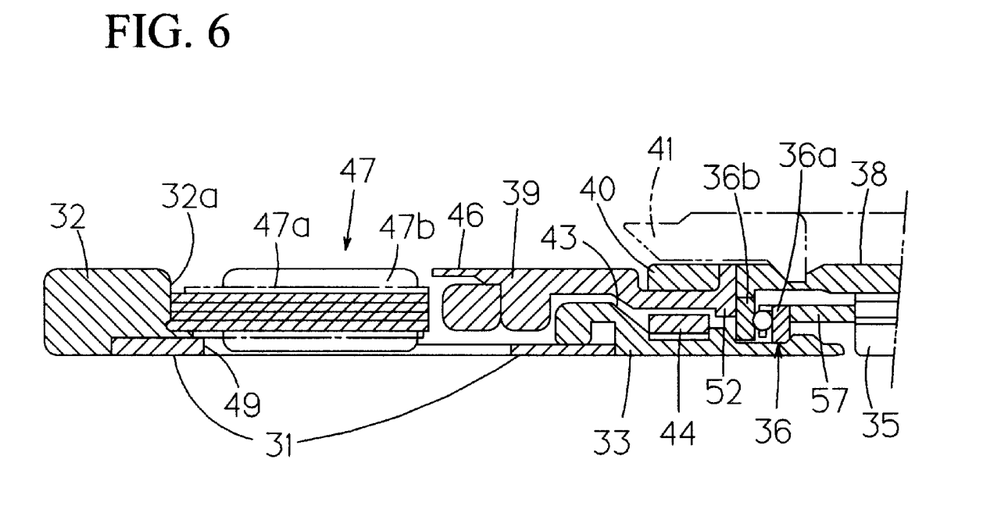
FIG. 6 is a partial, cross-sectional view of yet another embodiment of the present invention wherein the oil-impregnated bearing slidably contacts the inner race of the ball bearing assembly.

Turning to FIG. 6, another motor and bearing structure embodying the present invention is illustrated. The motor and bearing structure of FIG. 6 is essentially the same as that described above with reference to FIGS. 4 and 5, and therefore the same reference numerals are used to indicate the same elements. The primary difference between the embodiment of FIG. 6 in comparison to the embodiments of FIGS. 4 and 5 is that the oil-impregnated bearing 57 slidably contacts the inner peripheral surface of the inner race 36a of the ball bearing 36. In this embodiment, the inner race 36a is fixedly mounted to the support 33, and the outer race 36b rotates with the rotor and shaft relative to the inner race 36a and support 33. Similarly, the oil-impregnated bearing 57 is fixedly fitted onto the shaft 35 to rotate with the shaft relative to the inner race 36a.

Thus, according to the preferred features of the invention, the oil-impregnated bearing slides around either (i) the outer peripheral surface of the outer race of the ball bearing, or (ii) the inner peripheral surface of the inner race of the ball bearing. In either case, the component members included between the ball bearings and the oil-impregnated bearings in conventional motors as described above, and which can cause rotational instability, are eliminated. This, in turn, can significantly improve the rotational characteristics and the reliability of the motors and bearing structures of the present invention, since possible errors in writing data to or in reading data from a storage disk, such as a floppy disk, can be avoided.

Another advantage of these preferred embodiments of the present invention is that ball bearings employed in motors of this type are formed of a material having a high finishing accuracy and a high hardness, and the oil-impregnated bearings slidably contact the surfaces made of these materials. As a result, the service life of an oil-impregnated bearing can be increased, and furthermore, the service life of a motor employing such a bearing likewise can be increased in comparison to conventional motors employing oil-impregnated bearings as described above.

Another advantage of the present invention is that no component members are included between the ball bearing and the oil-impregnated bearing, and therefore the overall dimension of the motor in its radial direction can be reduced. In addition, processing for the component members, such as the bearing holders, is avoided, further resulting in a reduction of the processing time and associated costs for the motor as a whole.

Yet another advantage of the preferred embodiments of the present invention as illustrated in FIGS. 4 and 5 is that the oil-impregnated bearing slides around the outer peripheral surface of the outer race of the ball bearing. Accordingly, no component members are included between the ball bearing and the oil-impregnated bearing, and therefore the rotational characteristics of the motor can be significantly improved in comparison to conventional motors as described above.

Similarly, if desired, and as shown in FIG. 6, the oil-impregnated bearing may slide around the inner peripheral surface of the inner race of the ball bearing. Accordingly, since no component members are included between the ball bearing and the oil-impregnated bearing, the rotational characteristics of the motor likewise can be improved.

Another advantage of the present invention is that the ball bearing and/or the oil-impregnated bearing can be supported by the rotor without component members installed or otherwise included between the rotor and the ball bearing, or between the rotor and the oil-impregnated bearing. As a result, rotation of the motor can be stabilized, and furthermore, the overall dimension of the motor in its radial direction can be reduced.

Another advantage of the present invention is that vibration, wobbling, and the like during rotation of the motor can be avoided, allowing for the provision of a thin motor having a rotor defining a radius at least twice as large as the thickness of the shaft in the radial direction of the motor, which may be an inner rotor type or outer rotor type motor, and which exhibits stable and high quality rotational characteristics.

Yet another advantage of the present invention is that the diameter of the motor can be reduced. Therefore, even with a single ball bearing and a single oil-impregnated bearing rotatably supporting the rotor, the rotation can be stabilized.

Still another advantage of the present invention is that the motor can include both an oil-impregnated bearing as described above in combination with a preload magnet for magnetically attracting the rotor toward the magnet in approximately the axial direction of the motor. Accordingly, a sufficient preload can be applied to the ball bearing to further enhance, in combination with the effects of the oil-impregnated bearing, the rotational stability of the motor.

As will be recognized by those of ordinary skill in the pertinent art based on the teachings herein, numerous modifications may be made to the above-described and other embodiments of the present invention without departing from its scope as defined in the appended claims. As one example, the preload magnet of the present invention may take any of numerous different shapes and/or configurations, may be mounted in different positions or different locations within the motor, or may be formed of any of numerous different magnetic materials, in order to perform the functions described herein. For example, the preload magnet may take the form of a plurality of preload magnets which may be, if desired, spaced relative to each other, and which extend along an arc, or other discrete portion of a circumference. The plurality of preload magnets are spaced adjacent to the rotor to thereby magnetically attract the rotor in the axial direction of the motor and, in turn, apply a preload to the ball bearing assembly in accordance with the present invention. Similarly, the oil-impregnated bearings of the invention may take the form of any of numerous other types of lubricated bearings which now or later become known to those of ordinary skill in the pertinent art for performing the functions described herein. Accordingly, this detailed description of preferred embodiments is to be taken in an illustrative, as opposed to a limiting sense.

What is claimed is:

1. An electric motor, comprising:
   at least one support;
   a shaft defining an axis and rotatably mounted on the at least one support;
   a radially-extending rotor coupled to the shaft and rotatable therewith;
   a ball bearing assembly including an inner race, an outer race, and at least one ball bearing located between the inner race and outer race, and coupled between the shaft and the at least one support for rotating the shaft and rotor relative to the support; and
   at least one preload magnet fixedly coupled to the at least one support, axially spaced adjacent to the rotor, and extending along an approximate arc, to thereby magnetically attract the rotor in approximately the axial direction of the shaft and, in turn, apply a preload to the ball bearing assembly.

2. An electric motor as defined in claim 1, wherein the at least one preload magnet is formed of a material selected from the neodymium group.

3. An electric motor as defined in claim 1, wherein the at least one preload magnet is formed of a ferritic rubber material.

4. An electric motor as defined in claim 1, wherein:
   the at least one support defines a recessed surface facing the rotor, and the at least one preload magnet is mounted within the recessed surface;
   the ball bearing assembly is mounted between the recessed surface of the support and the shaft;
   the rotor defines a hub extending radially outwardly relative to the shaft and spaced adjacent to the ball bearing assembly, and a yoke extending radially outwardly relative to the hub and spaced adjacent to the recessed surface; and
   a predetermined spacing is defined between at least one of the rotor yoke and hub and the preload magnet to thereby magnetically attract at least one of the rotor yoke and hub toward the magnet, and in turn apply a preload to the ball bearing assembly directed in approximately the axial direction of the shaft.

5. An electric motor as defined in claim 1, comprising a single preload magnet.

6. An electric motor as defined in claim 1, wherein the at least one preload magnet is approximately arc shaped.

7. An electric motor as defined in claim 1, further comprising an oil-impregnated bearing slidably contacting one of (i) the outer race of the ball bearing assembly for rotating with the shaft and rotor relative to the outer race, and (ii) the inner race of the ball bearing assembly for rotating with the shaft and rotor relative to the inner race.

8. An electric motor as defined in claim 1, further comprising:
   a stator spaced adjacent to the rotor, fixed relative to the rotatable shaft and rotor, and defining a first magnetic center; and
   a drive magnet radially spaced relative to the stator, coupled to the rotor and rotatable therewith, and defining a second approximate magnetic center;
   wherein the first and second approximate magnetic centers are offset relative to each other in approximately the axial direction of the shaft to apply a further preload to the ball bearing assembly.

9. An electric motor as defined in claim 1, wherein at least one of the material and arcuate length of the least one preload magnet is selected to minimize rotational instability of the rotor.

10. An electric motor as defined in claim 9, wherein the at least one preload magnet is formed of a material selected from the neodymium group and is formed in an approximately arc-like shape defined by a radius, and the arcuate length of the preload magnet is within the range of approximately one sixth to approximately one eighth of a circumference defined by said radius.

11. An electric motor as defined in claim 9, wherein the at least one preload magnet is formed of a ferritic rubber material and is formed in an approximately arc-like shape defined by a radius, and the arcuate length of the preload magnet is equal to approximately one fourth of a circumference defined by said radius.

12. An electric motor, comprising:
   at least one support;
   a shaft defining an axis and rotatably mounted on the at least one support;
   a radially-extending rotor coupled to the shaft and rotatable therewith;
   a ball bearing assembly including an inner race, an outer race, and at least one ball bearing located between the inner race and outer race, and coupled between the shaft and the at least one support for rotating the shaft and rotor relative to the support; and
   means axially spaced adjacent to the rotor and extending within an approximate arc for magnetically attracting the rotor in approximately the axial direction of the shaft and, in turn, applying a preload to the ball bearing assembly.

13. An electric motor as defined in claim 12, wherein said means is defined by at least one approximately arc-shaped preload magnet.

14. An electric motor as defined in claim 12, wherein said means is formed of a material selected from the neodymium group, and extends within an arc having an arcuate length within the range of approximately one sixth through approximately one eighth of a circumference defined by a radius of said arc.

15. An electric motor as defined in claim 12, wherein said means is formed of a ferritic material, and extends within an arc having an arcuate length equal to approximately one fourth of a circumference defined by a radius of said arc.

16. An electric motor, comprising:
   at least one support;
   a shaft defining an axis and rotatably mounted on the at least one support;
   a radially-extending rotor coupled to the shaft and rotatable therewith;
   a ball bearing assembly including an inner race, an outer race, and at least one ball bearing located between the inner race and outer race, and coupled between the shaft and the at least one support for rotating the shaft and rotor relative to the support; and
   at least one lubricant-impregnated bearing rotatably supporting the shaft and rotor on the at least one support, and slidably contacting at least one of (i) the outer race of the ball bearing assembly for rotating with the shaft and rotor relative to the outer race, and (ii) the inner race of the ball bearing assembly for rotating with the shaft and rotor relative to the inner race.

17. An electric motor as defined in claim 16, wherein the at least one lubricant-impregnated bearing defines an approximate ring-like shape.

18. An electric motor as defined in claim 16, wherein the at least one lubricant-impregnated bearing is an oil-impregnated bearing.

19. An electric motor as defined in claim 16, wherein the inner race of the ball bearing assembly is fixedly coupled to the shaft and rotatable therewith, and the at least one lubricant-impregnated bearing is mounted between the rotor and the outer race of the ball bearing assembly and slidably contacts the outer race of the ball bearing assembly for rotating with the rotor and shaft relative to the outer race.

20. An electric motor as defined in claim 16, wherein the outer race of the ball bearing assembly is fixedly coupled to the rotor and rotatable therewith, and the at least one lubricant-impregnated bearing is mounted between the shaft and the inner race of the ball bearing assembly and slidably contacts the inner race of the ball bearing assembly for rotating with the rotor and shaft relative to the inner race.

21. An electric motor as defined in claim 16, wherein the rotor defines at least one recessed surface, and at least one of the lubricant-impregnated bearing and the outer race of the ball bearing assembly is received within the recessed surface and fixedly secured to the rotor therein.

22. An electric motor, comprising:
   at least one support;
   a shaft defining an axis and rotatably mounted on the at least one support;
   a radially-extending rotor coupled to the shaft and rotatable therewith;
   a ball bearing assembly including an inner race, an outer race, and at least one ball bearing located between the inner race and outer race, and coupled between the shaft and the at least one support for rotating the shaft and rotor relative to the support;
   means for rotatably supporting the shaft and rotor and slidably contacting at least one of (i) an outer peripheral surface of the outer race of the ball bearing assembly for rotating with the shaft and rotor relative to the outer race, and (ii) an inner peripheral surface of the inner race of the ball bearing assembly for rotating with the shaft and rotor relative to the inner race.

23. An electric motor as defined in claim 22, wherein said means is defined by at least one approximately ring-like, lubricant-impregnated bearing.

24. An electric motor as defined in claim 22, wherein said means is fixedly connected to the shaft, extends between the shaft and the inner peripheral surface of the inner race, and slidably contacts the inner peripheral surface of the inner race.

25. An electric motor as defined in claim 22, wherein said means is fixedly connected to the rotor, extends between the rotor and the outer peripheral surface of the outer race, and slidably contacts the outer peripheral surface of the outer race.

26. An electric motor, comprising:

a shaft defining an axis and rotatably mounted on the at least one support;

a radially-extending rotor coupled to the shaft and rotatable therewith;

a ball bearing assembly including an inner race, an outer race, and at least one ball bearing located between the inner race and outer race, and coupled between the shaft and the at least one support for rotating the shaft and rotor relative to the support;

at least one preload magnet fixedly coupled to the at least one support, axially spaced adjacent to the rotor, and extending along an approximate arc, to thereby magnetically attract the rotor in approximately the axial direction of the shaft and, in turn, apply a preload to the ball bearing assembly; and at least one lubricant-impregnated bearing rotatably supporting the shaft and rotor on the at least one support, and slidably contacting at least one of (i) the outer race of the ball bearing assembly for rotating with the shaft and rotor relative to the outer race, and (ii) the inner race of the ball bearing assembly for rotating with the shaft and rotor relative to the inner race.

27. A thin electric motor, comprising:

a rotary shaft defining a axis of rotation;

a stationary support extending substantially perpendicular to the axis of the shaft;

a rotor fixedly coupled with the shaft to rotate integrally with the shaft, the rotor extending radially outward from the shaft and substantially parallel to the support;

a ball bearing assembly having an outer race, an inner race, and a plurality of balls rotatably supported between the races, the inner race being fixedly coupled with the shaft and the outer race being fixedly coupled with the stationary support to rotatably support the shaft on the stationary support; and a lubricant-impregnated member interposed between the rotor and the ball bearing assembly, wherein the lubricant-impregnated member is fixedly coupled with the rotor and in sliding contact with the outer race.

28. A thin electric motor as defined in claim 27, further comprising a pre-load magnet fixedly mounted on a surface of the stationary support adjacent to the rotor to attract the rotor.

29. A thin electric motor as defined in claim 28, wherein the pre-load magnet is arc shaped.

30. A thin electric motor as defined in claim 27, further comprising a permanent magnet fixedly carried by the rotor at a radially outer periphery thereof, and a stator fixedly mounted on the stationary support to oppose the permanent magnet, the stator being located radially outside of the permanent magnet.

31. A thin electric motor, comprising:

a rotary shaft defining an axis of rotation;

a stationary support extending substantially perpendicular to the axis of the shaft;

a rotor fixedly coupled with the shaft to rotate integrally with the shaft, the rotor extending radially outward from the shaft and substantially parallel to the support;

a ball bearing assembly having an outer race, an inner race, and a plurality of balls rotatably supported between the races, the outer race being fixedly coupled with the rotor and the inner race being fixedly coupled with the stationary support to rotatably support the rotor on the stationary support; and a lubricant-impregnated member interposed between the shaft and the ball bearing assembly, wherein the lubricant-impregnated member is fixedly coupled with the shaft and is in sliding contact with the inner race.

* * * * *